United States Patent [19]

Hold et al.

[11] 4,421,412
[45] Dec. 20, 1983

[54] PROCESS AND APPARATUS FOR PROCESSING PLASTIC AND POLYMERIC MATERIALS

[75] Inventors: Peter Hold, Milford, Conn.; Zehev Tadmor, Haifa, Israel; Lefteris N. Valsamis, West Haven, Conn.

[73] Assignee: USM Corporation, Farmington, Conn.

[21] Appl. No.: 444,497

[22] Filed: Nov. 24, 1982

Related U.S. Application Data

[63] Continuation-in-part of Ser. No. 971,332, Dec. 20, 1978, abandoned.

[51] Int. Cl.³ ............................ B01F 5/12; B01F 7/10; B29B 1/06; B29B 3/02
[52] U.S. Cl. .................................... 366/76; 72/262; 366/77; 366/91; 366/99; 366/262; 366/307; 366/315; 415/90; 415/102; 425/204; 425/224; 425/466
[58] Field of Search ................ 366/52, 69, 75–77, 366/80, 90, 91, 97–99, 136, 230, 231, 262–265, 266, 293, 302–307, 312, 314, 315, 316, 336, 337, 340, 348; 72/60, 70, 262; 415/90, 101, 102; 264/85, 349; 425/204, 224, 209, 466, 374, 376, 86

[56] References Cited

U.S. PATENT DOCUMENTS

| | | | |
|---|---|---|---|
| 4,142,805 | 3/1979 | Tadmor | 366/97 |
| 4,194,841 | 3/1980 | Tadmor | 366/75 |
| 4,213,709 | 7/1980 | Valsamis | 366/99 X |
| 4,227,816 | 10/1980 | Hold et al. | 366/99 |
| 4,255,059 | 3/1981 | Hold et al. | 366/97 |
| 4,300,842 | 11/1981 | Hold et al. | 366/99 |
| 4,329,065 | 5/1982 | Hold et al. | 366/97 |

Primary Examiner—Timothy F. Simone
Attorney, Agent, or Firm—John P. Morley; Frances J. P. Craig

[57] ABSTRACT

Novel and improved processes and apparatus for processing particulate materials which can be converted to the liquid state. Essentially, the process and apparatus involve feeding a particulate material to an annular processing passage for melting and controlled processing. The annular processing passage is provided by a rotatable element carrying at least one processing channel, and a stationary element which provides a complementary, coaxial surface arranged with the channel to provide the enclosed processing passage. Also associated with the stationary element are an inlet for feeding material to the passage, an outlet for discharging material, a material collecting end wall surface for the passage and a member or members extending into the processing channel providing a material restraining surface between the inlet and outlet and occupying a predetermined portion of the melt pool space between the end wall and the restraining surface. Rotation of the rotatable element establishes relative movement between the rotating inner channel wall surfaces and the restrained particulate material, causing only liquid (melted) material in contact with the rotating channel walls to be dragged forward to the end wall surface for controlled processing and discharge. Controlling the size of the melt pool space provides control of processing characteristics for the liquid material collected in the melt pool space.

34 Claims, 26 Drawing Figures

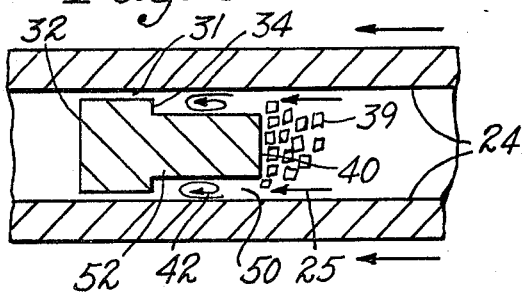
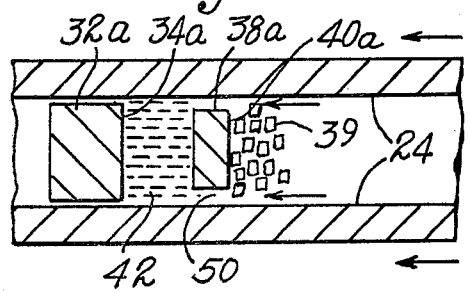
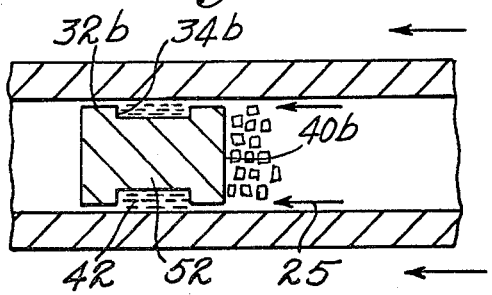

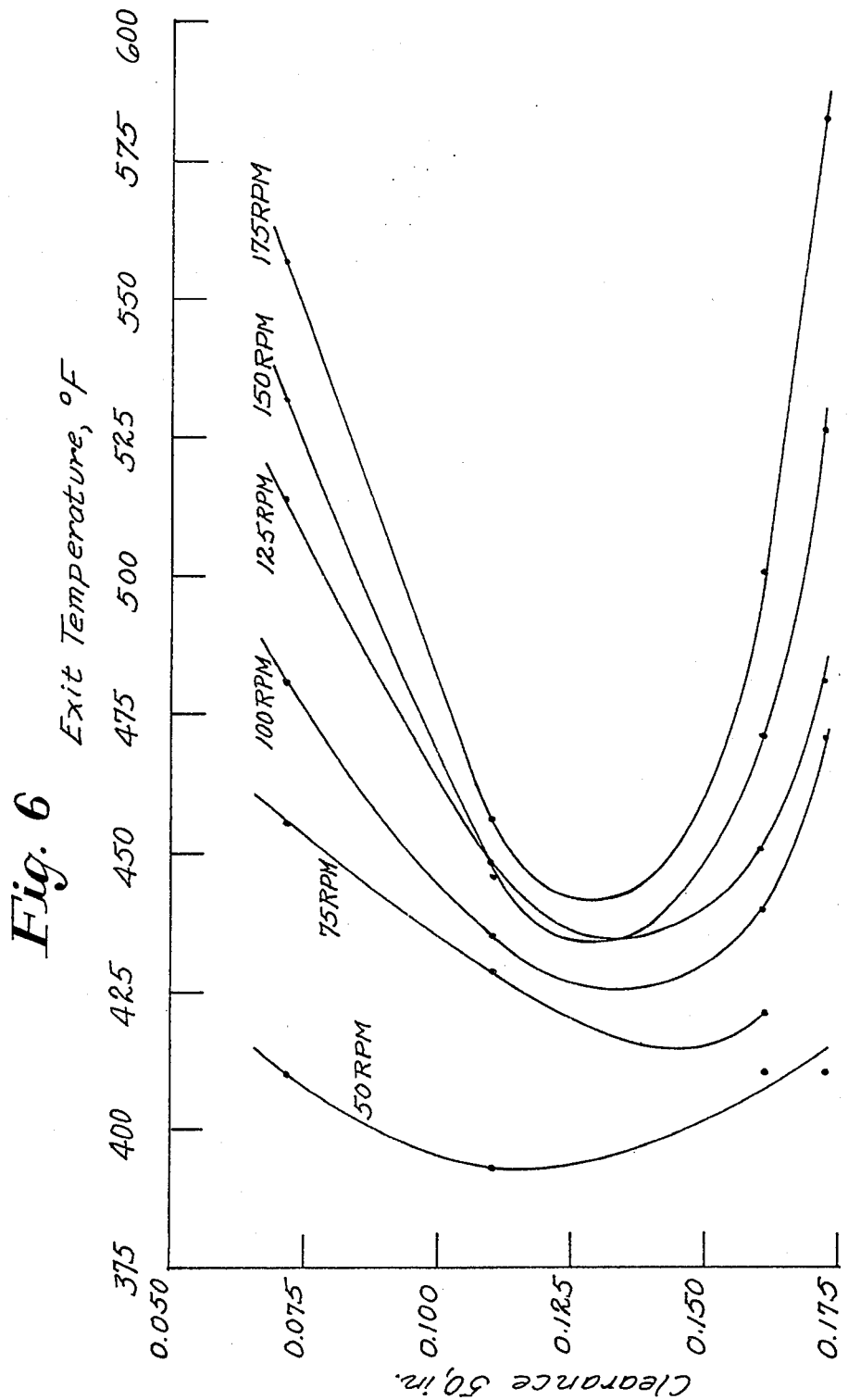

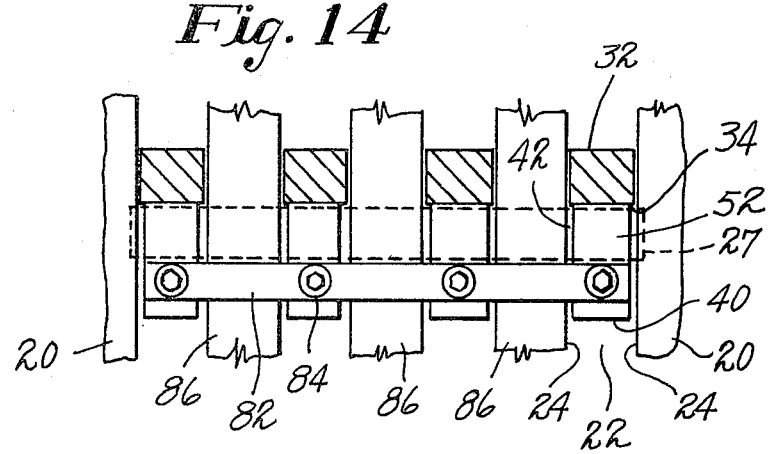
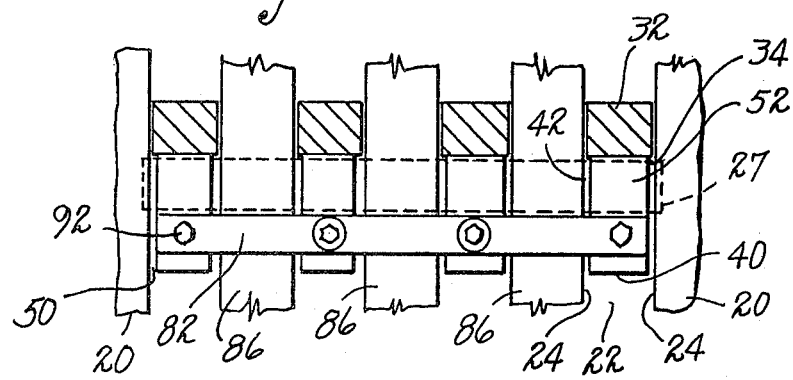
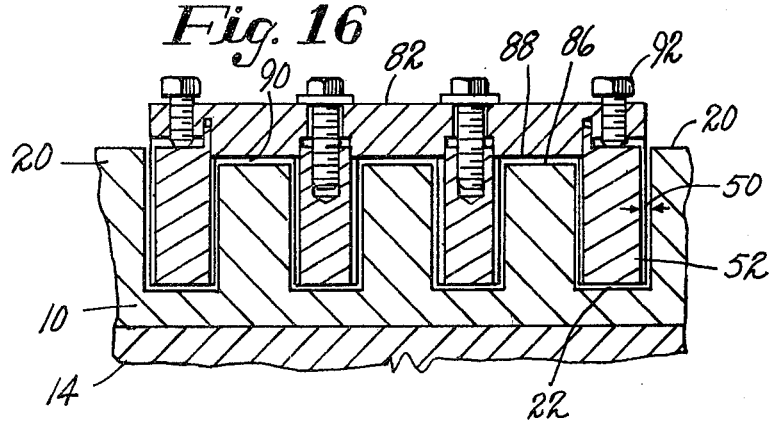

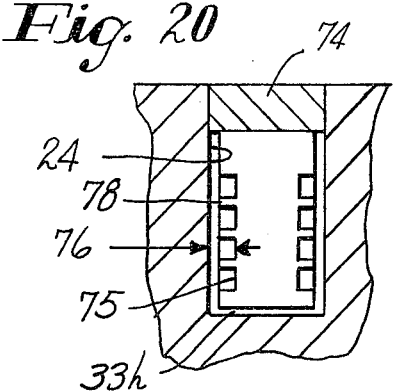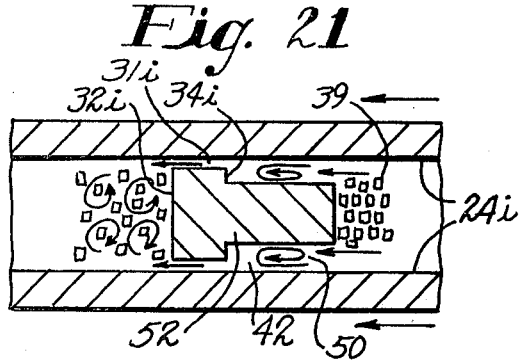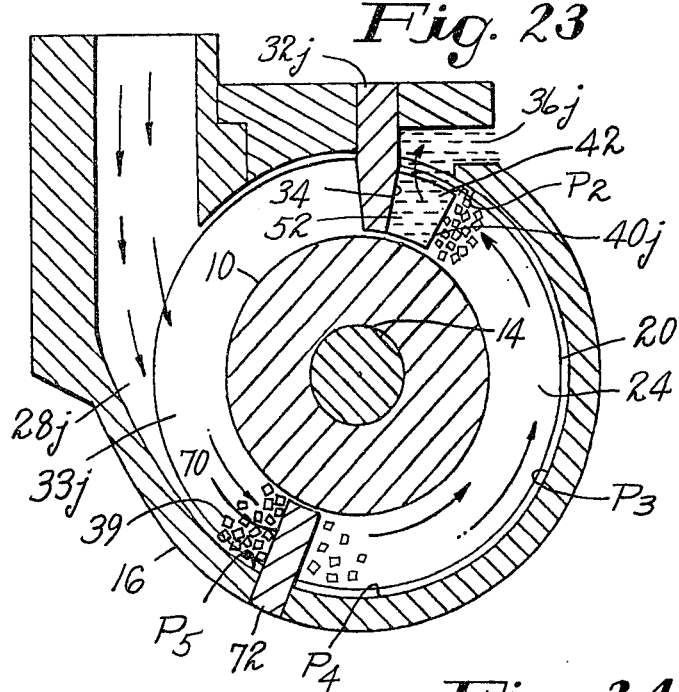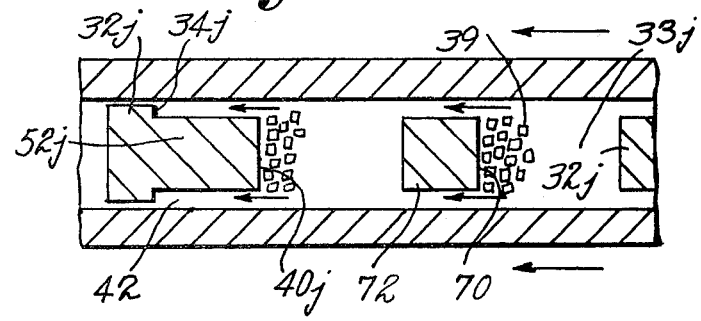

PROCESS AND APPARATUS FOR PROCESSING PLASTIC AND POLYMERIC MATERIALS

CROSS REFERENCE TO RELATED APPLICATIONS

This application is a continuation-in-part of our application Ser. No. 971,332 filed Dec. 20, 1978, and now abandoned.

THE FIELD OF THE INVENTION

This invention relates to novel, improved methods and apparatus for processing particulate materials which can be converted to the liquid state. The novel, improved processes and apparatus are particularly adaptable for processing particulate plastic or polymeric materials which can be converted to the liquid state.

DESCRIPTION OF THE PRIOR ART

U.S. Pat. Nos. 4,142,805 and 4,194,841 to Zehev Tadmor—one of the inventors of this application—disclose processes and apparatus for processing plastic or polymeric materials. U.S. Pat. Nos. 4,142,805 and 4,194,841 are expressly incorporated here by reference.

The essential elements of the basic, individual, annular processing passage described in the above U.S. patents comprise a rotatable element carrying at least one annular processing channel formed by opposed side walls and a stationary element providing a coaxial surface cooperatively arranged with the channel to form an enclosed processing passage. The stationary element has an inlet to feed material to the passage for processing and an outlet to discharge processed material from the passage. A member providing a material collecting end wall surface is arranged with the stationary element and located in the passage near the outlet to obstruct or restrain movement of material fed to the passage and to coact with the rotating channel walls to provide relative movement between the material and the internal surfaces of the channel walls rotated toward the outlet.

In the preferred embodiment of the invention described in U.S. Pat. Nos. 4,142,805 and 4,194,841 the essential elements of the processing apparatus are arranged so that the rotatable, channel carrying element is adapted for rotation in a stationary housing or chamber (the statioary element). The described processing channel and preferably a plurality of processing channels are formed in the cylindrical surface of a rotor with each channel having opposed side walls extending inwardly from the rotor surface. The stationary housing or chamber described has an internal, cylindrical surface providing the cooperative coaxial surface which together with the annular processing channel(s) form an enclosed processing passage(s).

The method and apparatus of the Tadmor patents are described as useful for conveying of solids, melting or plasticating plastic or polymeric material; conveying, pumping or pressurizing viscous liquid material; mixing, blending, dispersing and homogenizing material; and devolatilizing and/or bringing about molecular or microscopic or macroscopic structural changes by chemical reactions such as polymerization.

The apparatus and methods disclosed in the above-referenced U.S. patents are generally suitable for processing particulate plastic or polymeric materials particularly when lower speeds of rotation of the channel walls and accordingly lower melting rates are involved. However, when higher speeds of rotation are used to achieve higher melting rates, the quality of the discharged viscous liquid material can be affected. For example, with some particulate material processed at higher melting rates, the discharged viscous liquid material has been found to contain insufficiently melted particulate material and in some cases, better (more precise) control over discharge conditions such as pressure and temperature of the discharged viscous liquid material was considered desirable.

BRIEF SUMMARY OF THE INVENTION

The present invention provides improvements in the processes and apparatus disclosed in referenced U.S. Pat. Nos. 4,142,805 and 4,194,841 for processing particulate materials which in the course of processing become liquid materials. Essentially, this invention presents processes and apparatus in which a body of material is fed to one or more processing passages for melting. The processing passage is provided by two elements. One element is a rotatable element carrying at last one processing channel having a processing surface area including opposed side walls. The other element is a stationary element providing a coaxial surface which togehter with the channel(s) form the annular processing passage(s). Additionally, the stationary element has associated with it, an inlet for feeding particulate material to the passage, and an outlet spaced apart from the inlet for discharging melted material from the passage. Also associated with the stationary element is a member located in and extending into the channel and providing an end wall surface for the passage near the outlet.

In accordance with this invention, a member associated with the stationary element provides a particulate material restraining surface which is located in and extends into the channel at a position upstream from the end wall surface so that a liquid collecting space is provided between the particulate material restraining surface and the end wall surface. Additionally, means are positioned between the end wall and restraining surfaces defining the lqiuid collecting space to occupy a predetermined portion of the space to provide a liquid collecting space of predetermined geometry designed to provide preselected discharge conditions for liquid material collected in the space. Improved overall melting efficiency and improved quality of melted product as well as more precise control over discharge pressure and rate are obtained according to the practice of the present invention.

Details relating to the novel rotary processors and methods of this invention as well as the advantages derived from such processors and methods will be more fully appreciated from the Detailed Description of the Preferred Embodiments taken in connection with the Drawings.

BRIEF DESCRIPTION OF THE DRAWINGS

FIG. 3 is a flattened sectional view of the channel of FIG. 2 taken along a selected radius and illustrates the unitary member of FIG. 2.

FIG. 4 is a flattened sectional view of a channel taken along a selected radius and illustrates a melt pool without a melt pool space control means of this invention.

FIG. 6 is a graph of data illustrating the relationship between melt pool size and temperatures of processed material at various rotor speeds.

FIG. 7 is a flattened sectional view of a channel taken along a selected radius and illustrates another preferred unitary member of this invention.

FIG. 14 is a flattened schematic view partially in section of several adjacent channels shown in FIG. 1 and includes a preferred arrangement of members providing a restraining surface and melt pool space control means of this invention with a fixed common bracket.

FIG. 15 is a flattened schematic view partially in section of several adjacent channels shown in FIG. 1 and illustrating another preferred arrangement with an adjustable bracket.

FIG. 16 is a sectional view taken along an axial plane of the several adjacent channels of FIG. 15.

FIG. 20 is a sectional view taken along line XX of the channel portion shown in FIG. 19.

FIG. 21 is a flattened sectional view of a channel taken along a selected radius and illustrates another preferred unitary member of this invention and movement of material in the channel.

FIG. 23 is still another enlarged and somewhat simplified cross-sectional view of a channel shown in FIG. 1 and includes a preferred arrangement of members providing restraining surfaces of this invention.

FIG. 24 is a flattened, sectional view of the channel of FIG. 23 and illustrates movement of material in the channel.

DETAILED DESCRIPTION OF THE PREFERRED EMBODIMENTS

Figure 1:
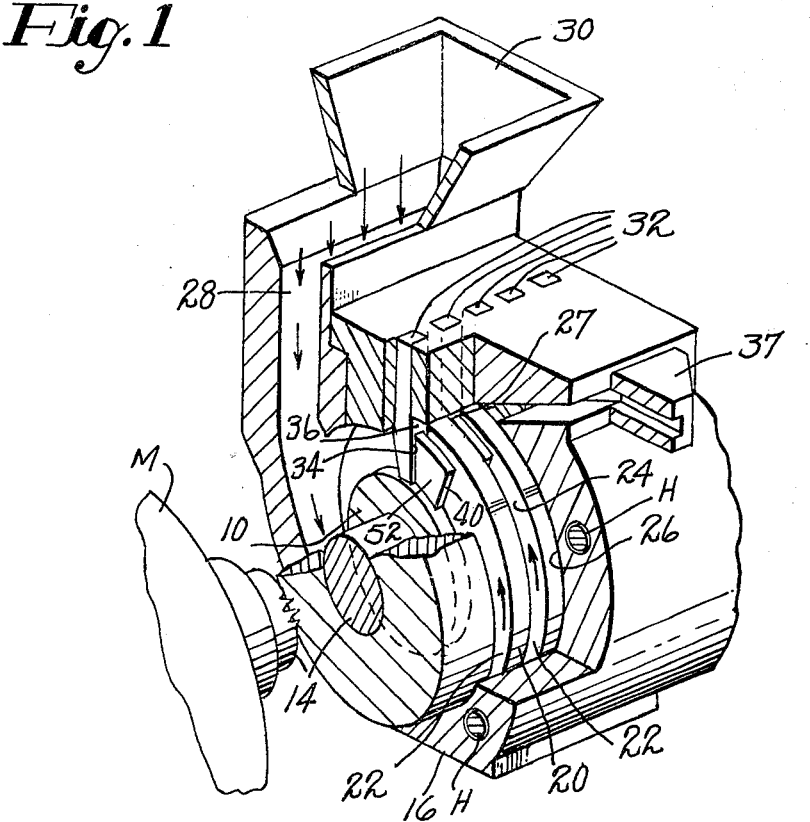
FIG. 1 is a schematic perspective view of the processing apparatus which is exploded to show the various parts.

The method and apparatus of the present invention provide distinctive improvements in processing materials which can be converted to the liquid state. Apparatus suitable for practicing the present invention is shown in FIG. 1 as a rotary processor. The rotary processor includes a rotatable element comprising a rotor 10 mounted on a drive shaft 14 for rotation within a stationary element comprising a housing 16. Rotor 10 has a surface 20 which is a surface of rotation coaxial with rotor 10, preferably cylindrical as shown and carrying at least one processing channel 22 formed by opposing side walls 24 extending inwardly from surface 20. Means for rotating rotor 10 are shown as a motor M which may be of any well known type commonly used for rotating extruders or similar polymeric processing apparatus well known to those in the art. Housing 16 of the stationary element provides a cylindrical surface 26 coaxial with and cooperatively arranged with surface portions 20 of rotor 10 to form with channel(s) 22, an enclosed annular processing passage(s).

The stationary element also has associated with it an inlet opening 28 for introduction of particulate material for processing from a suitable feeder shown as a hopper 30, into annular channel 22. Various devices for feeding particulate material other than the gravity feed hopper shown may be used. These devices include among others, a screw feeder, a ram feeder, or a disc-type preheater feeder.

Also associated with the stationary element (housing 16) is an outlet 36 spaced apart from inlet 28. Near outlet 36 and mounted on housing 16 is member 32 which extends into channel 22 and provides an end wall surface 34 and scraper portions in close relation to walls 24 of the channel. Member 32 has a shape complementary to and fitting closely within channel 22 into which it extends. End wall surface 34 of member 32 may be disposed at an angle normal to the direction of flow in the channel or, alternatively, surface 34 may be tilted relative to the radial direction or the axial direction or both. This tilting can be advantageous in reducing pressure losses and inducing a self-cleaning action in the vicinity of the channel outlet by inducing a drag flow component in the radial or axial direction. End wall surface 34 may be either planar or non-planar in configuration. A shaping die 37 may be disposed directly in the outlet.

Figure 2:
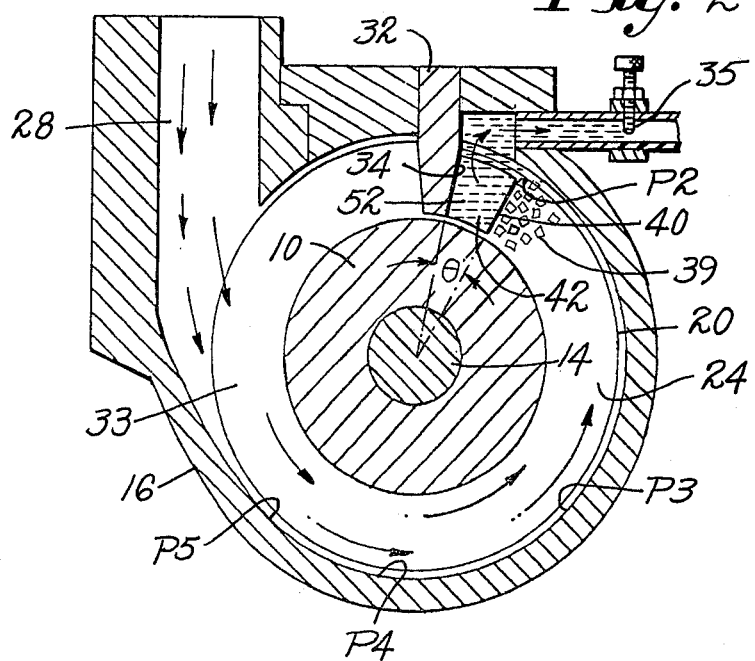
FIG. 2 is an enlarged and somewhat simplified cross-sectional view of a channel shown in FIG. 1 and includes a preferred arrangement of a unitary member providing a restraining surface and a melt pool size control means of this invention.

In accordance with the preferred embodiment of this invention, member 32 includes an extension 52 (FIGS. 1 to 3) which is used to reduce the available cross-sectional area in channel 22 near outlet 36. As best shown in FIGS. 2 and 3, extension 52 is connected to end wall surface 34 of member 32 and extends upstream of surface 34 and terminates at particulate material restraining surface 40. Restraining surface 40 has at least a portion of its shape adapted to fit within its associated channel so as to provide a surface which can effectively restrain, and/or obstruct movement of any substantial portions of unmelted particulate material beyond surface 40. At the same time, the shape of restraining surface 40 is adapted to provide sufficient clearance to permit mainly melted material to be dragged by side walls 24 past surface 40 and extension 52 toward end wall surface 34 while movement of the unmelted particulate material is held or restrained by surface 40.

In operation of the processor, particulate material is fed by the feeding device into one or more channels 22 through inlet 28. As rotor 10 turns, the dragging action of rotating channel side walls 24 on the particulate material results in a velocity gradient within the material, with the material closest to the moving walls having a different velocity from the material remote from the walls. As the particulate material is dragged forward in the passage, the main body of particulate material is held by restraining surface 40 so that rotating channel side walls 24 and restraining surface 40 coact to establish relative motion between walls 24 and the main body of restrained particulate material. Usually there is a vigorous recirculation of melted and/or partially melted material and/or particulate material at surface 40, and portions of the particulate material are converted to the molten state by heat generated by the relative motion. Additionally, increased melting can be provided by heating means H shown in FIG. 1. Suitable heating means may also include chambers provided on the outside of each channel wall so that a temperature control fluid can be introduced into each chamber for heat transfer through the walls of the channel as described in referenced U.S. Pat. Nos. 4,142,805 and 4,194,841. Melted (or liquid) material in contact with walls 24 of channel 22, therefore, is dragged by walls 24 past surface 40 toward end wall surface 34 where it is collected as a pool 42 for controlled processing and/or discharge through outlet 36.

In practice, it has been found that the larger the cross-sectional area of available melt pool space, the larger the pool of collected melted or liquid material required to generate discharge pressure. In turn, for a given discharge pressure, this may result in higher melt pool temperatures and longer residence time for material in the melt pool. Higher temperatures and longer melt pool residence times are conditions that can affect the quality of processed melted materials. The rotary processor melting passages of this invention include means to control melt pool space so that material discharge characteristics can be adjusted to a preselected degree.

Member 32 of FIGS. 2 and 3 illustrates the preferred embodiment of this invention in which the means to control melt pool space is integrated with restraining surface 40 and end wall surface 34. Member 32 of FIGS. 2 and 3 is a unitary element providing a restraining surface 40 and an end wall surface 34 interconnected by extension 52 which provides the means to control melt pool space. The illustrated integral member is "T" shaped in section with planar surfaces 40 and 34 normal to the direction of flow. Extension 52 occupies a portion of the space between surfaces 34 and 40 and therefore provides means to control the amount of available space or volume for melt pool 42, thus controlling the material discharge characteristics at outlet 36.

The mechanism is schematically shown in FIG. 3. As shown, movement of the main body 39 of the particulate material is held back by and compacted against surface 40 as a result of the relative motion between the rotating side walls 24 of channel 22 and the restrained body of particulate material. This relative motion generates friction which can cause melting of portions of the particulate material and/or optionally, as mentioned, channel walls 24 may be preheated. In any case, a film of melted material 25 is formed on side walls 24 of the channel. The film in contact with walls 24 moves forward with walls 24 and is vigorously sheared by motion relative to main body 39 of restrained particulate material in the channel to generate further heat by viscous dissipation.

The action of side walls 24 of channel 22 in dragging forward melted material 25 on their surfaces builds up pressure progressively along the length of travel of the side walls usually reaching a maximum value in the region of restraining surface 40. In some cases however, depending on such features as the geometry, shape and position of surface 40 and the operating speed, maximum pressure could be reached at surface 34 of member 32. End wall surface 34 scrapes off melted material 25 carried forward by the side walls of the channel and the scraped-off material accumulates as a pool 42 against end wall 34 and may be discharged through outlet 36, the discharge pressure and melt characteristics at the outlet being largely determined by the shape, geometry and position of extension 52 within the melt pool. Accordingly, extension 52 can be varied in configuration to provide a melt pool space having a predetermined geometry or size or volume. Melt pool spces having a predetermined geometry, size or volume present the capability for providing preselected processing characteristics including maximized discharge pressure characteristics particularly desired for collected liquid material in the pool space.

As already discussed, the pressure generated for discharge of the liquid material collected in the pool is a factor that can affect the quality of the discharged melted material. However, this invention provides a degree of control over the processing conditions applied to the liquid material collected in the melt pool in terms of the shear forces applied to the collected material as well as the temperature and melt pool residence time of discharged melted material. The distinctive advantages of providing a melt pool space of predetermined geometry, size or volume can be better understood by referring to the following examples.

EXAMPLE 1

A rotary processor of the type described with reference to FIGS. 1–3 was employed to process low density polyethylene. The processor included a rotor having an O.D. of 7.5 in. and carrying a single melting channel having a width of 0.75 in. and a depth of 1.76 in. The temperature of both the housing and the rotor was maintained at 400° F. A T-shaped member 32 was positioned in the passage at the outlet as shown in FIG. 3. The angular distance θ (FIG. 2) between surfaces 34 and 40 was 25°. Clearance 50 between channel walls 24 and the side walls of extension 52 was 0.100 in. which was the largest clearance which provided exiting material free of unmelted material. The processor was operated at various rotor speeds. The processing rate and temperature of the exiting material are shown in Table 1, below.

The same processor described above was then altered as shown in FIG. 4, by replacing unitary T-shaped member 32 with separate members 32a and 38 providing end wall surface 34a and restraining surface 40a respectively. The angular distance between surfaces 34a and 40a was 70°. Clearance 50a between channel walls 24a (FIG. 4) and the side walls of member 38 was 0.65 in which was the largest clearance which would provide exiting material free of unmelted particles. The processor was again operated at various rotor speeds. The results are also shown in Table 1, below:

TABLE 1

| | With Extension 52 | | Without Extension 52 | |
|---|---|---|---|---|
| Rotor Speed rpm | Processing Rate lb/hr | Exit Temp. °F. | Processing Rate lb/hr | Exit Temp. °F. |
| 50 | 33.8 | 363 | 35.4 | 373 |
| 100 | 51.3 | 386 | 55.8 | 391 |
| 150 | 66.8 | 404 | 71.0 | 430 |
| 200 | 85.3 | 413 | 83.4 | 447 |
| 250 | 98.8 | 434 | 93.6 | 477 |
| 300 | 107.4 | 451 | 102.6 | 499 |

As illustrated by Table 1, controlling the size of the melt pool space by including extension 52 between the end wall and restraining surfaces results in lower temperatures of exiting melt while minimally affecting processing rates for each rotor speed. These lower temperatures can improve the quality of exiting melt by minimizing thermal degradation.

The clearance (or gap) 50 (FIG. 3) between side portions of surface 40 and walls 24 is a factor of some importance since it must permit only melted liquid material to be dragged past surface 40 to melt pool 42 while the body of unmelted or incompletely melted particulate material is restrained by surface 40. Clearance 50 is also a factor in determining the size of the melt pool space. Extension 52 can be varied in configuration to provide varying clearances 50, thus providing control over the temperature, pressure and melt characteristics at the outlet. The advantages of controlling the size of clearance 50 may be best understood by reference to the following example.

EXAMPLE 2

Figure 5:
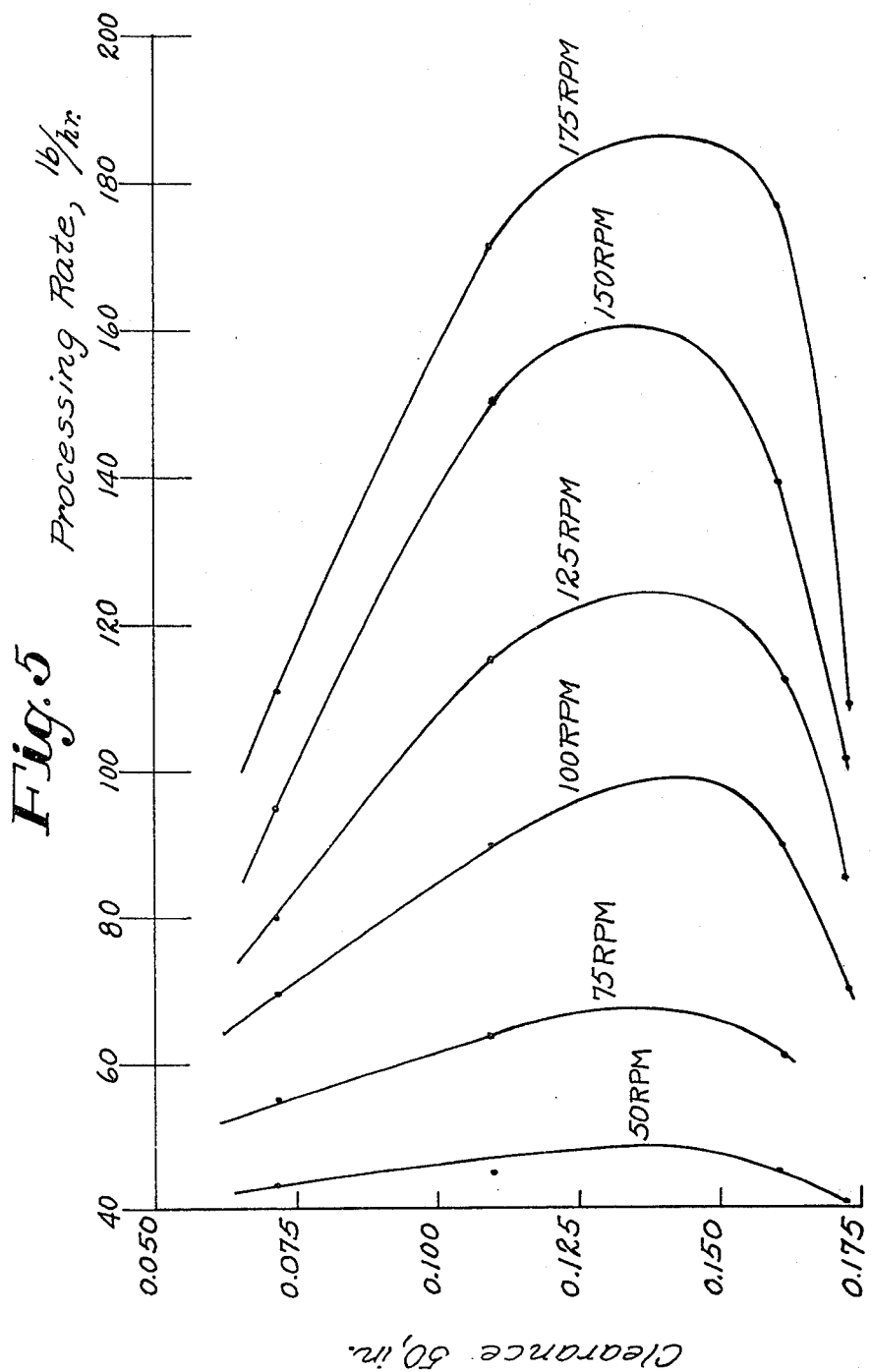
FIG. 5 is a graph of data illustrating the relationship between melt pool size and processing rates at various rotor speeds.

A rotary processor of the type illustrated in FIGS. 1–3 was employed to process high density polyethylene. The processor included a rotor having an O.D. of 6.12 in. and carrying two melting channels, each having a width of 0.75 in. and a depth of 1.03 in. The temperature of the housing was maintained at 400° F. Using an extension 52 having a clearance 50 (FIG. 3) of 0.072 in., the processor was operated at various rotor speeds. The processing rate and temperature and pressure of the exiting material are shown in the graphs of FIGS. 5 and 6.

The same processor described above was then altered to progressively increase clearance 50. The processor was operated at various rotor speeds for each clearance 50. FIGS. 5 and 6 show maximum processing rates and minimum exit temperatures for each rotor speed within a narrow range of optimum clearances 50, approximately from 0.110 in. to 0.150 in.

The above examples clearly illustrate the degree of control this invention provides over the processing conditions applied to the liquid material collected in the melt pool.

As explained above, the function of extension 52 is to provide means to control melt pool space by providing melt pool spaces of preselected geometries. Accordingly the shape and arrangement of the melt pool space control means can vary. FIG. 7 illustrates such a variation in which member 32 is unitary and "I" shaped in section with planar surfaces 34b and 40b normal to the direction of flow.

Figure 8:
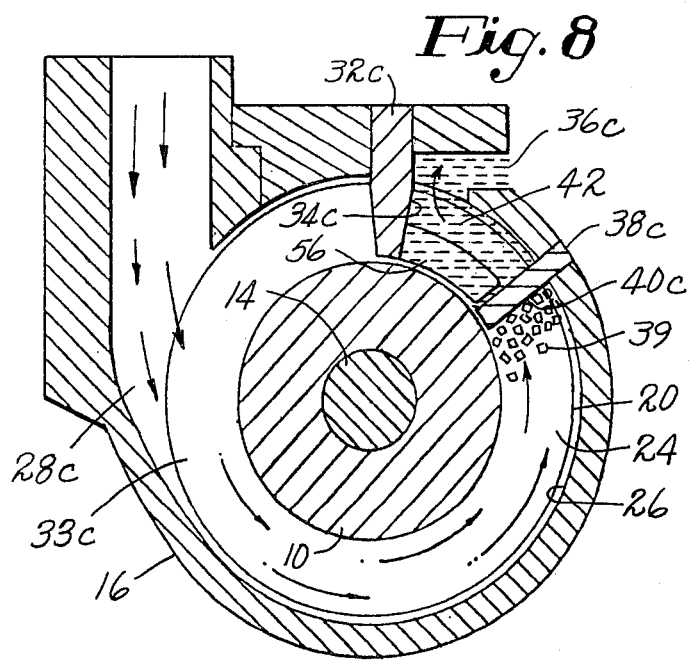
FIG. 8 is another enlarged and somewhat simplified cross-sectional view of a channel shown in FIG. 1 and includes another preferred arrangement of a restraining surface and a melt pool space control means of this invention.
Figure 9:
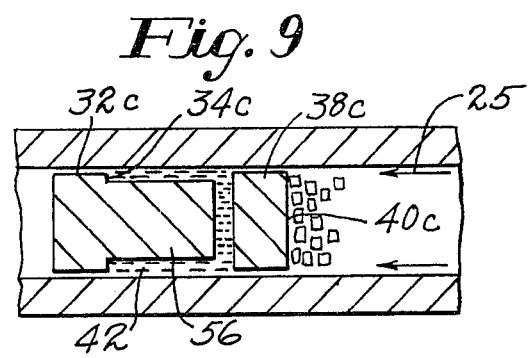
FIGS. 9, 10, 11 and 12 are flattened, sectional views of a channel taken along a selected radius and illustrate other forms of members providing a restraining surface with members providing an end wall surface and melt pool space control means, and movement of material in the channel.
Figure 10:
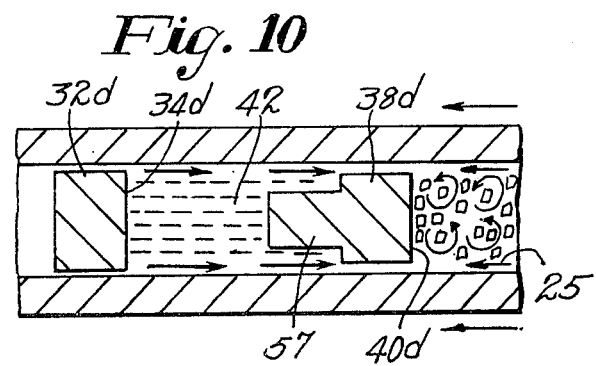
Figure 11:
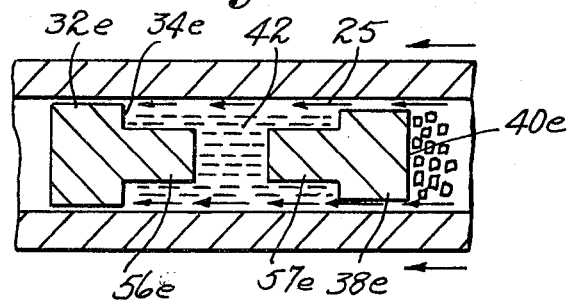
Figure 12:
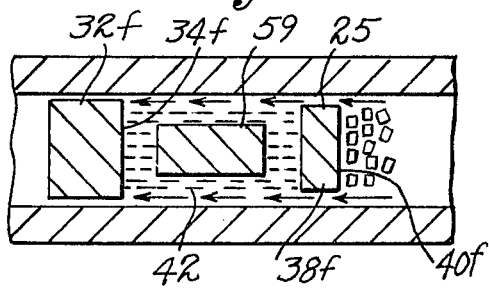

FIGS. 8, 9, 10, 11 and 12 illustrate other variations of melt pool space control means. As shown in FIGS. 8 and 9, two members securely associated with the stationary element are used to provide the end wall surface and the restraining surface. Member 32c provides end wall surface 34c while member 38c provides restraining surface 40c. Extension 56 is connected to element 32c only and extends between members 32c and 38c to control melt pool space between them. Control over the geometry, size, volume or configuration can also be achieved in the manner shown in FIGS. 10 and 11. In FIG. 10 two members 32d and 38d provide surfaces 34d and 40d respectively with extension 57 connected to member 38d. In FIG. 11, extensions 56e and 57e are connected to members 32e and 38e respectively and extend inwardly into the melt pool space between members 32e and 38e but do not connect the members. Alternatively a non-interconnecting insert 59 (FIG. 12) can be positioned between members 32f and 38f to control melt pool space.

Figure 13:
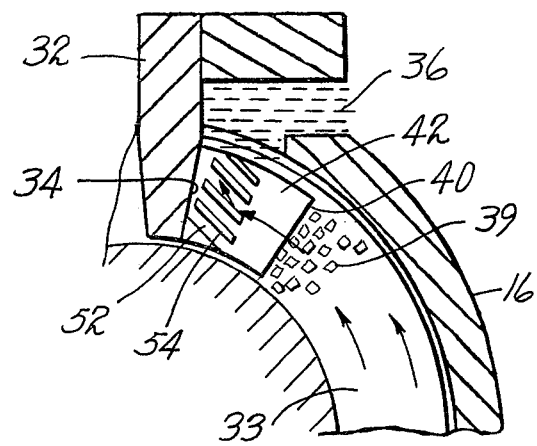
FIG. 13 is an enlarged and somewhat simplified cross-sectional view of a portion of a channel shown in FIG. 1 and illustrates another preferred arrangement of a member providing a restraining surface and a melt pool space control means.

In the embodiments of the invention discussed thus far, the surfaces of extensions 52, 56, 57 and 59 have been illustrated as smooth and radially or circumferentially disposed. However, extensions 52, 56, 57 and 59 can vary in shape, orientation and configuration, depending on the processing characteristics desired. An especially advantageous design for the extensions is shown in FIG. 13 where extension 52 includes side surfaces facing the channel walls 24 and carrying flights 54 angled to induce a drag flow component in the radially outward direction. These flights act in a manner similar to that described above for non-radial positioning of end wall surface 34, reducing pressure losses at outlet 36. As illustrated in FIG. 13, liquid material following the flow path indicated by the arrows is dragged past surface 40 to melt pool 42, where flights 54 of extension 52 deflect the material from the circumferential flow path effected by the rotation of the channel walls and inducing flow toward outlet 36.

As described in referenced U.S. Pat. Nos. 4,142,805 and 4,194,841 control of the rate at which processed material is allowed to discharge from the channel is an important factor in determining the extent to which the material is processed, and outlet 36 can be constructed and arranged to provide this discharge control. Control may be effected by the size of the opening or by throttling valve 35 (FIG. 2) or other device in the discharge outlet. The discharge rate may also be controlled by connecting the outlet opening to a further processing stage such as an extrusion nozzle or die 37 (FIG. 1) or the like which may provide desired flow resistance controlling the rate of discharge from the outlet and the extent of processing of material in the channel.

Processing apparatus according to the present invention may have more than one channel in which the outlet from one channel may be led through a conduit to the inlet of a further channel for further processing. This arrangement is particularly valuable since the series pressure-producing and pumping action of successive processing channels is cumulative so that high outlet pressure is readily secured. It will be understood that successive channels may each have different geometry from other channels for best processing of material supplied to it. Also, material processed in and discharged from one channel or a given number of channels operating in parallel may be fed to one channel or to any suitable number of channels operating in parallel. Particularly suitable means for transferring material from one processing passage to another are described in commonly assigned U.S. Pat. No. 4,227,816 to Peter Hold and Zehev Tadmor.

As shown in FIGS. 2 and 3, member 32 is positioned in melting passage 33 to restrain or obstruct movement of any substantial amounts of particulate material 39 at a position between inlet 28 and outlet 36. Preferably, member 32 is positioned between inlet 28 and outlet 36 so that there is at least sufficient space or volume between restraining surface 40 and end wall surface 34 to collect a pool of viscous liquid which, for the particular viscous liquid involved, wets sufficient area of the walls to generate discharge pressure by movement of the walls. Preferably however, member 32 is positioned as far as possible from inlet 28. Accordingly, the position of member 32 can vary depending primarily on the size of the melt pool 42 required in the space between surface 40 and end wall 34 and between the side walls of extension 52 and the channel walls 24 to provide discharge pressure.

The size of the pool needed also depends on such factors as the particular viscous liquid involved, the degree of discharge pressure desired, the area of the walls and their rate of movement. However, the particular position selected for member 32 can be determined empirically. An illustrative suitable position for member 32 with respect to end wall 34 is designated in FIG. 2 as $\theta$ which represents the angle between surface 40 of member 32 and end wall surface 34. In general, the value of angle $\theta$ need not be greater than about 90° and should be at least about 10° with preferred values for angle $\theta$ being from about 15° to about 40°.

At larger preferred values of $\theta$, extension 52 of a unitary member 32 may extend upstream from surface 34 sufficiently to create a potential for deflection of the upstream extending end from the desired position within the channel due to high pressures developed at or near surface 40. This deflection can be avoided or minimized by fixedly securing the extending end to the housing such as by bolting the extending end to the housing. FIG. 14 illustrates a suitable arrangement of elements for avoiding or minimizing deflection where two or more adjacent melting passages each contain members 32 arranged at substantially the same circumferential position in each passage. As shown there a bracket 82 associated with housing 16 may be arranged to extend across the upstream end of each extension and a bolt 84 used to secure each extension at its upstream end to the bracket 82.

The shape of material restraining surface 40 (FIGS. 2 and 3) can also vary. However, as mentioned, at least a portion of the shape must be capable of effectively restraining the movement of substantially all particulate (unmelted) material 39 into melt pool 42. Preferred surfaces 40 are those which are solid throughout but they may have openings or a portion of them may have openings so long as the openings do not interfere with the assigned restraining function. For example, a screen or a plurality of them may be used in fabricating suitable material restraining surface providing members of this invention.

Apparatus of this invention normally include a plurality of melting passages having a common outlet 27 such as shown in FIGS. 1 and 14. Common outlet 27 preferably involves a groove in housing 16 operationally arranged with surface 34 of each passage to discharge material from melt pool 42. Outlet 27 extends over all adjacent melting passages 22, as well as over rotor surface portions 20 intermediate adjacent channels. One form of apparatus of this invention may involve a single stage comprising only a plurality of melting passages as described above and shown in FIG. 1. In this form, particulate material is fed to the inlet, processed as described and collected melted material is discharged directly from the apparatus through common outlet 27. In another form of apparatus of the invention, a plurality of melting passages described above are arranged to be part of a multi-stage apparatus to provide a melting stage which is interconnected to another or further processing stage. In this form collected material is transferred to the further processing stage by way of common outlet 27.

With either form of apparatus discussed above, it is not generally necessary to prevent leakage between the melting passages since pressure and other conditions within the passages are substantially the same. Indeed, oftentimes it is desirable to encourage interchange of material between the melting passages, and FIGS. 15 and 16 illustrate an effective arrangement of elements for achieving this interchange. As shown in FIGS. 15 and 16, rotor surface portions 86 between adjacent channels are recessed relative to rotor surface 20 to encourage and permit interchange of material between melting passages. This recess provides an increased clearance 90 between the channel surface portions 86 and rotor surface 20.

The arrangement of elements shown in FIGS. 15 and 16 is designed to control clearance 90 during operation. Control is achieved by unitary bracket 82 which is movable both upwardly and downwardly such as by adjustment screws 92. As shown, bracket 82 extends across all channel surface portions 86 and preferably is positioned upstream of common outlet 27. Control over clearance 90 is designed to provide improved quality of melted material discharged from the melting passages through common outlet 27. For example, excessive amounts of incomplete or partially melted particulate material passing over surface portions 86 may be carried by the rotation of surface portions 86 through clearance 90 to outlet 27 where it would be mixed with melted material from melt pool 42. In this case, adjustment of bracket 86 can reduce clearance 90 to control access of unmelted material to outlet 27. Alternatively when larger amounts of partially melted material are acceptable in the material discharged by way of outlet 27, bracket 86 can be adjusted to increase clearance 90. Larger amounts of partially melted material are oftentimes acceptable in multi-stage apparatus in which melted material is transferred from the melting stage to a further processing stage.

The capability for adjusting clearance 90 is particularly useful when the material processed has a relatively high viscosity when melted. Melted material having a high viscosity can provide excessive temperature and pressure rises at clearance 90 which can thermally degrade or otherwise adversely affect the quality of melt product. By increasing clearance 90, temperature and pressure levels can be reduced. For example, clearance 90 can be increased to permit passage to outlet 27 of partially melted material which can be completely melted on mixing with the melted material during further processing to minimize the temperature increase of the melted material during the further processing.

Special advantages may be obtained by using clearances 50 between walls 24 and the peripheral portions of restraining surface 40 which are less than the thickness of the layer of liquid material dragged by the walls.

These clearances can be varied depending on desired or preselected shear and stress conditions to be applied to the particular liquid material being dragged by walls 24 into melt pool 42. Also, these clearances can be used in combination with members providing a surface 40 which have a leading edge or a portion of a leading edge adapted to scrape off some of the liquid material so that the scraped-off material can be mixed with particulate material at or near surface 40.

Efficient mixing of particulate or partially melted material with melted material is a particularly desirable feature in the operation of apparatus of this invention. Many arrangements of elements can be employed to achieve efficient mixing.

One arrangement for achieving the desirable mixing of liquid material with particulate or partially melted material in the channel is illustrated in FIG. 10. There, a back pressure may be established in melt pool 42 such as by adjusting the outlet valve (not shown) or, by using other discharge pressure control means described above. This back pressure causes accumulation of liquid material at or near the surface 40d. Progressive accumulation of additional liquid material promotes efficient mixing with particulate material in the region of surface 40d and improves overall melting efficiency.

Figure 17:
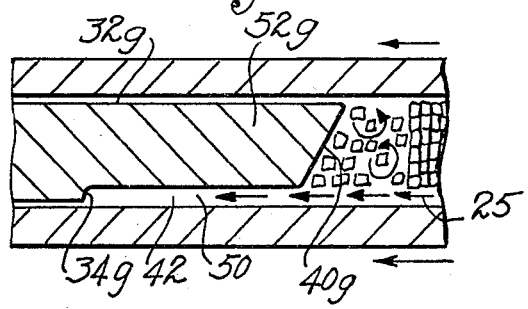
FIG. 17 is a flattened, sectional view of a channel taken along a selected radius and illustrates another preferred unitary member and movement of material in the channel.

A particularly preferred method of mixing liquid material with particulate material at or near the restraining surface is shown in FIG. 17. The illustrated unitary member of FIG. 17 comprises a restraining surface 40g and end wall surface 34g. Restraining surface 40g is angular with respect to the direction of flow and a scraping clearance is provided between one channel wall and a side of member 32 to form an acute angle with surface 40g. A clearance 50 is provided between the opposite channel wall and the opposite side of the member, which forms an obtuse angle with surface 40g. Clearance 50 therefore provides a melt pool space 42 and liquid material is collected against surface 34g. Because of the scraping clearance, liquid material is scraped off the moving channel wall at the apex of surface 40g. This scraped off liquid material is mixed with and contacts particulate material at or near surface 40g in the manner shown in FIG. 16. The other channel wall however drags liquid material to surface 34g where it is collected as a melt pool 42 for processing and discharge.

Figure 18:
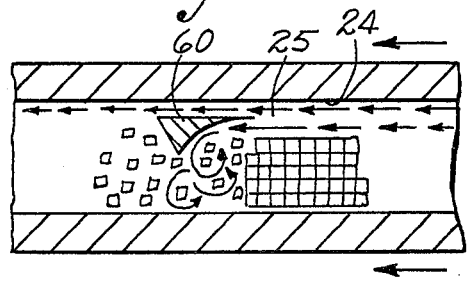
FIG. 18 is a flattened sectional view of a channel taken along a selected radius and illustrating the action of a scraping and mixing element on a layer of liquid material carried on a channel wall and movement of material in the channel.

Still another method for achieving mixing of liquid material with restrained particulate material is shown in FIG. 18. There, scraping and mixing element 60 is shown in a fixed, stationary position adjacent a channel wall 24 and positioned between the inlet (not shown) and the material restraining surface (not shown). Scraping and mixing element 60 is arranged substantially parallel to and spaced apart from channel wall 24 by a close clearance which permits member 60 to scrape off at least a portion of—and preferably substantially all of—the liquid material 25 dragged by wall 24 to scraping and mixing element 60. Element 60 is shaped to provide efficient mixing of the scraped-off liquid material with restrained particulate material at or near member 60. It should be understood that more than one scraping and mixing element 60 can be positioned adjacent channel wall(s) 24 between the inlet and the material restraining surface. Also, one or more scraping and mixing element(s) 60 can be positioned adjacent one or both walls 24 and spaced apart from each other along the circumferential distance between the inlet and material restraining surface to provide the desired degree of mixing of melted material with restrained particulate material.

Figure 19:
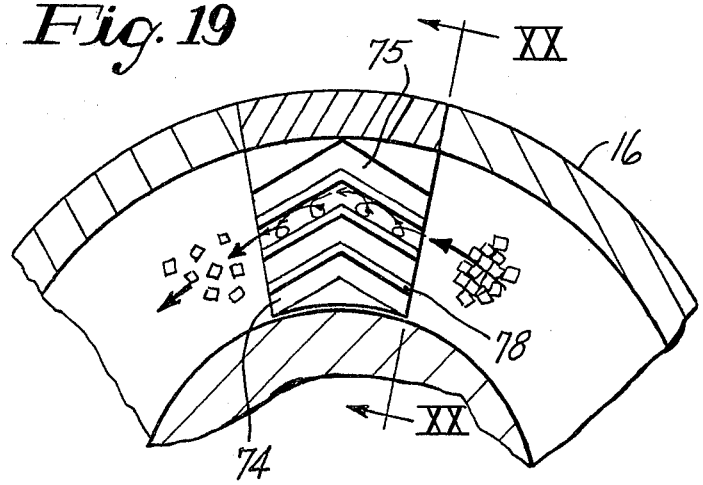
FIG. 19 is an enlarged and somewhat simplified cross-sectional view of a portion of a channel shown in FIG. 1 and illustrates a mixing member inserted in the channel and movement of material in the channel.

Another method for achieving mixing of liquid material with unmelted or partially melted material is shown in FIGS. 19 and 20. One or more mixing elements 74 are mounted on housing 16 and extend into passage 33h. Element 74 has a shape complementary to passage 33h with a clearance (or gap) 76 between side portions 75 of element 74 and channel walls 24 which is greater than the thickness of the layer of liquid material dragged by the walls. This relatively large clearance permits both liquid and particulate material to pass by element 74 for mixing. Flights 78, angled with respect to the direction of flow in the passage, are provided on side portions 75 of element 76 adjacent channel walls 24 to induce efficient mixing of melted and unmelted material as it passes through clearance 76. The mechanism is schematically shown in FIG. 19. Unmixed melted and unmelted material approach element 74 following the flow path indicated by the large arrows, and are carried into gap 76 (FIG. 20) by the dragging action of the channel walls 24 on the material. Within gap 76, flights 78 deflect the material from the circumferential flow path effected by the rotation of the channel walls, inducing a radial flow component and causing a circulating flow pattern, as indicated by the smaller arrows in FIG. 19. The flights illustrated in FIG. 19 are disposed in a chevron pattern, but other configurations may be chosen, depending on the material and the degree of mixing desired.

In the description of the invention so far, end wall surface 34 has been described as having the function of scraping off melted material dragged to it by walls 24 so that a pool of liquid material can be collected at end wall 34 for discharge. However, special advantages can be obtained by allowing certain clearances or by providing means to move the member carrying end wall surface 34 in and out of the channel or by providing means that can otherwise permit at least some of the liquid material to pass by surface 34 for recycling. The recycled liquid material can contact and mix or fuse with restrained particulate material in the channel upstream of the material restraining surface providing member. This contact and mixing and fusion of recycled liquid material with particulate material has been found to have an important effect which can improve overall melting efficiency. We believe that the improved melting efficiency achieved by effective mixing is a result of the viscous melted material penetrating between unmelted pellets of the feed and providing deformation for the mixture of melted and unmelted materials. Shaft power accordingly can be converted into thermal energy at higher rates throughout the volume of the channel. FIG. 21 illustrates this recycling of liquid material past surface 34i through clearance 31i, and mixing of melted liquid material with the restrained particulate material. The distinctive advantages of this recycling are illustrated by the following example.

EXAMPLE 3

A rotary processor of the type described with reference to FIGS. 1-3 was employed to process high density polyethylene. The processor included a rotor having an O.D. of 5.9 in. and carrying two melting channels operating in parallel, each channel having a width of 0.75 in. and a depth of 1.03 in. The temperature of the housing was maintained at 400° F., that of the rotor at 325° F. Clearance 50 between the channel walls and extension 52 (FIG. 3) was 0.159 in. Clearance 31 between channel walls and the sides of end wall surface 34 was 0.010 in., providing a scraping clearance and permitting substantially no liquid material to be dragged past surface 34. The processor was operated at various rotor speeds. The processing rate, electrical power input, and temperature and pressure of the exiting liquid material at each rotor speed are shown in Table 2, below.

The same processor described above was then altered to provide clearance 31$i$ between channel walls 24 and surface 34$i$ of 0.075 in. (FIG. 21), allowing a portion of the liquid material to be dragged past surface 34$i$ for recycling as described above. The processor was again operated at various rotor speeds. The results are also shown in Table 2, below.

TABLE 2

| Rotor Speed, rpm | Power, amp. | Processing Rate, lb/hr | Exit T, °F. | Exit P, psi |
|---|---|---|---|---|
| With Scraping Clearance 31, 0.010 in. | | | | |
| 50 | 80 | 40/50 | 410 | 700 |
| 100 | 90 | 87/91 | 440 | 1000 |
| 125 | 93 | 110/114 | 450 | 1000 |
| 150 | 95 | 140/136 | 470 | 1000/1200 |
| 175 | 100 | 180/172 | 499 | 1200 |
| With Bypass Clearance 31i, 0.075 in. | | | | |
| 50 | 86 | 57/56 | 400/387 | 780/900 |
| 100 | 95/107 | 116/119 | 445/428 | 1120/1000 |
| 125 | 95/107 | 145/142 | 430/415 | 1200/1000 |
| 150 | 95/107 | 170/176 | 440/429 | 1200/1000 |
| 175 | 95/107 | 206/213 | 474/458 | 1250/1000 |

Figure 22:
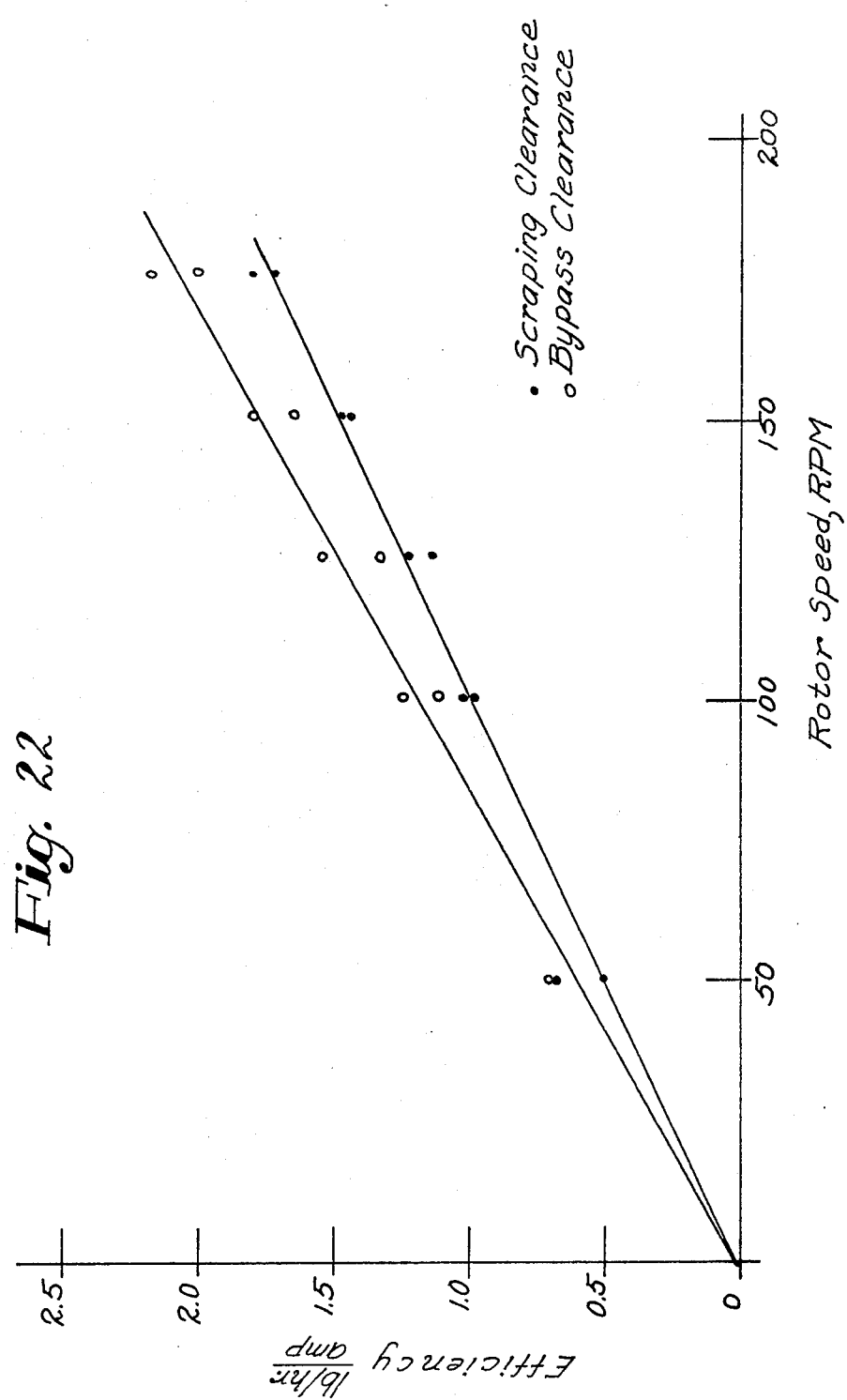
FIG. 22 is a graph of actual testing data illustrating the effectiveness of the preferred unitary member of FIG. 21.

From the above results, it is apparent that providing means for dragging at least some of the liquid material past surface 34$i$ for recycling can result in significantly improved overall melting rate with no significant decrease in the discharge pressure. Also, the increased melting rate is achieved without significantly increasing the temperature of the liquid material, thereby maintaining the quality of the discharged material. Most importantly the power required is reduced, providing an increase in melting efficiency, expressed in (lb/hr)/amp, of nearly 20% as shown in FIG. 22.

The rotary processor melting passages of the invention described thus far have included one particulate material restraining surface. However, distinct advantages can be obtained by using more than one material restraining surface in the melting passages. These advantages will be better appreciated by reference to FIGS. 23 and 24. As shown in FIG. 23, particulate material 39 fed or introduced to rotary processor melting passage 33$j$ by way of inlet 28$j$ is urged forward by the rotating channel walls to restraining surface 70 of first member 72. The shape and dimensions of member 72 are selected to provide clearances between the channel and the bottom and sides of member 72 so that unmelted as well as melted materials can be dragged past member 72. Melted and unmelted material dragged past member 72 is urged forward to restraining surface 40$j$ of second member 32$j$. Surface 40$j$ is shaped and dimensioned to restrain movement of unmelted material but to permit melted or partially melted material to be dragged forward to surface 34$j$. Melted material collected in melt pool 42 is discharged from melting passage 33$j$ through outlet 36$j$.

The illustrated use of more than one particulate material restraining surface providing member is especially desirable for melting passages assigned high melting rates. The mechanical energy (introduced through the shaft) which can be dissipated into heat in melting passages of this invention is proportional to rotor speed and pressure rise in the chamber. In other words, $$Pw \propto N \Delta P \qquad (1)$$

where Pw is power, N is rotor speed, and $\Delta P$ is the pressure rise. The melting rate G is directly proportional to shaft power input (neglecting heat conduction) and therefore, $$G \propto N \Delta P \qquad (2)$$

Equation 2 indicates that the higher $\Delta P$ which can be generated and tolerated in the melting passage, the higher the melting rate (G). The pressure rises which can be generated in a melting passage are a function of chamber geometry and material properties. However, the pressure rise which can be tolerated in a melting passage is a function of mechanical design.

In designing rotary processors comprising a plurality of melting passages, a constraint has been encountered which can impose limitations on the level of tolerable pressure rise in the passages. Essentially, the constraint arises because differential radial pressures are established along the circumference of the melting passage. Normally, the pressure increases as the channel walls rotate from the inlet toward the particulate material restraining surface and reach a maximum at the restraining surface. In cases of melting passages, maximum pressures attainable can be high, e.g. 1500 psi or greater. As the number of melting passages carried by a rotor increase, this differential or imbalance of radial pressures can be great enough to significantly increase shaft bearing load and shaft deflection.

The manner of achieving increased melting rates for melting passages by using more than one particulate material restraining surface providing member may be better understood by comparing the melting passages shown in FIGS. 2 and 23. In a melting passage (33) of the type shown in FIG. 2, particulate material is restrained only by surface 40. Pressure within passage 33 is at a minimum at inlet 28 but increases progressively about the length of the passage until the maximum pressure rise $\Delta P$ is reached at surface 40. Accordingly, the melting rate G of passage 33 follows equation (2) or $$G \propto N \Delta P$$

In a melting passage (33$j$) of the type shown in FIG. 23 (and 24), material restraining surfaces 70 and 40$j$ are positioned apart from each other in passage 33$j$ by about 180° and maximum pressures $\Delta P_1$ and $\Delta P_2$ are developed at surfaces 70 and 40$j$ respectively. For illustrative purposes, assume that passage 33$j$ of FIG. 23 is assigned the same melting rate as passage 33 of FIG. 2. In this case G of passage 33$j$ equals G of passage 33 and the same pressure rise is needed in each passage. However, G of passage 33$j$ is not expressed by equation 2 but instead is expressed as follows:

$$G \propto N(\Delta P_1 + \Delta P_2) \qquad (3)$$

Accordingly, if $\Delta P_1$ and $\Delta P_2$ generated at surfaces 70 and 40$j$ respectively of FIG. 23 are each equal to about one half of $\Delta P$ generated at surface 40 of FIG. 2, the melting rates G of passages 33$j$ and 33 would be substantially equal.

Pressure within passage 33*j* is at a minimum at inlet 28*j* but increases progressively as material is dragged forward to surface 70 of member 72 and pressure reaches a maximum ($\Delta P_1$) at surface 70. In this case however the maximum pressure ($\Delta P_1$) developed at surface 70 is controlled to be about one half of the total pressure required.

The pressure developed at surface 70 can be controlled by the appropriate selection of the shape and dimensions of member 72. The selected shape and dimensions provide sufficient restraining action to establish relative movement between the rotating channel walls and particulate material between inlet 28*j* and surface 70. However, the selected shape and dimensions permit significant amounts of particulate or incompletely melted material to be dragged past member 72 so that only a fraction (preferably one-half) of the total pressure rise needed is developed at surface 70.

As the material is dragged past member 72, pressure is reduced significantly but progressively rises again as material is dragged forward to surface 40*j* where again only a fraction of the total pressure rise needed is developed. Pressure developed at surface 40*j* is primarily a function of the amount of particulate material dragged forward to the surface 40*j* and the efficiency of the blocking and scraping action provided by the shape and dimensions of member 32*j*.

The arrangement of two—rather than one—material restraining surface providing members in a melting passage provides the total needed pressure rise for the desired high melting rate. However, the maximum pressure at each restraining surface (70 and 40*j*) is only about one-half of the needed pressure. Accordingly, the arrangement shown in FIGS. 23 and 24 provides maximized melting rates for melting passages with lower pressure levels and therefore reduced deflection potential. More importantly, the arrangement further reduces the deflection potential because the arrangement or positioning of the restraining members can be selected so that the pressure at the restraining surface of one member balances or otherwise opposes the pressure at the restraining surface of the other member. If more than two material restraining surface providing members are arranged in a melting passage, the pressure at each restraining surface can be controlled so that each pressure rise is substantially equal to the needed pressure rise divided by the number of material restraining surfaces arranged in the melting passage. Also, the more than two material restraining surfaces would be arranged or positioned apart from each other so that the pressure at each restraining surface balances or opposes pressures at the other restraining surfaces. The distinctive advantages of providing more than one material restraining surface are best understood by referring to the following example.

EXAMPLE 4

A rotary processor similar to that described with reference to FIGS. 1–3 was employed to process low density polyethylene. The processor included a rotor having an OD of 7.5 in. and carrying a single channel having a width of 0.75 in. and a depth of 1.76 in. The temperature of both the housing and the rotor were maintained at 400° F. Clearance 50 (FIG. 3) was 0.150 in. Gravity feed was used at inlet 28. Two tests were run at 100 rpm and 200 rpm respectively, measuring the pressures generated in the material at points $P_2$, $P_3$, $P_4$ and $P_5$ along the circumference of the channel (FIG. 2).

Figure 25:
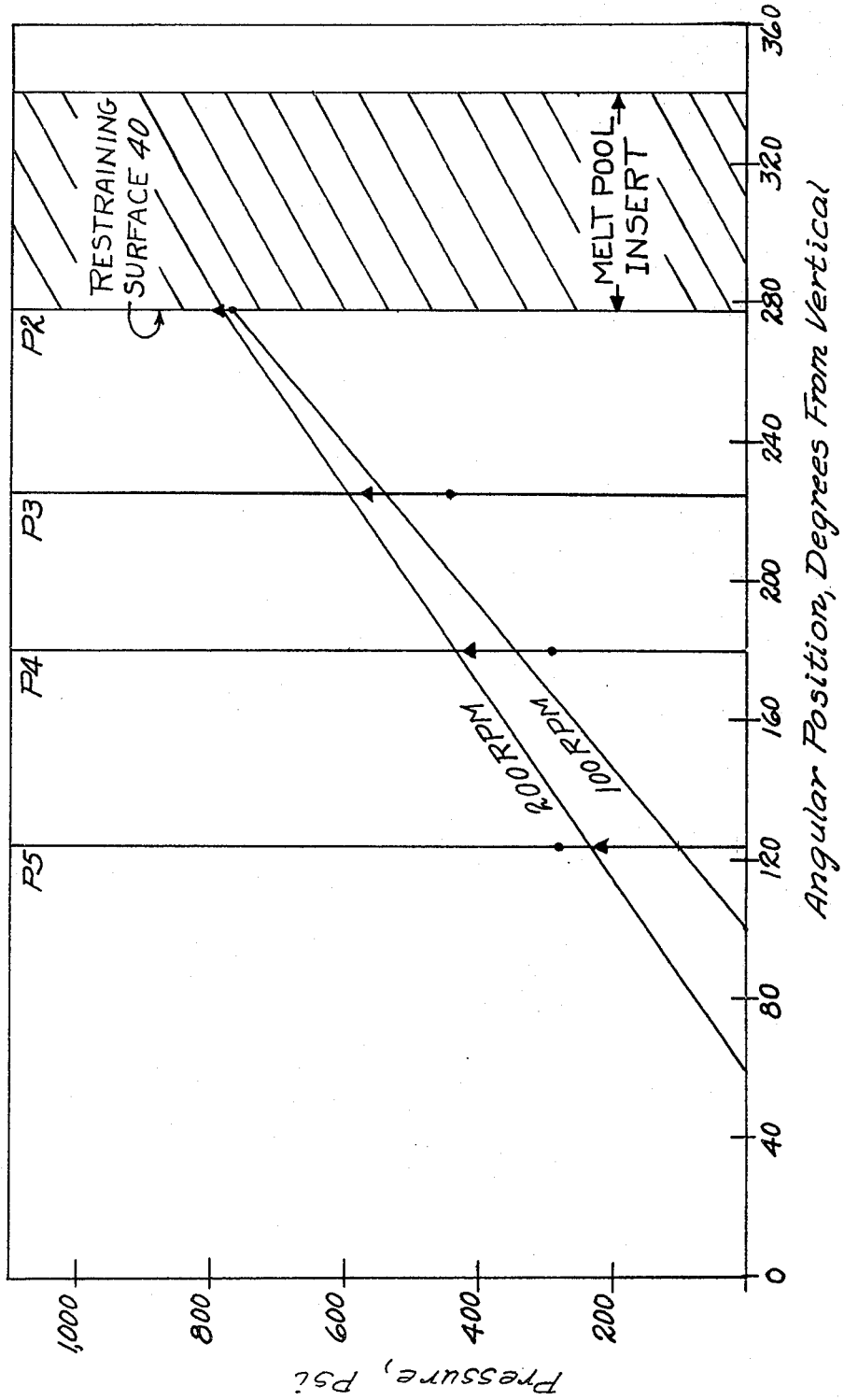
FIGS. 25 and 26 are representations of pressure profiles developed along the circumference of the channels illustrated in FIGS. 2 and 23 respectively.

As illustrated in FIG. 25, the pressure generated in the material increases about the circumference of the passage, reaching a maximum at restraining surface 40 of 765 psi and 780 psi at speeds of 100 rpm and 200 rpm respectively. The melting rates were 55 lb/hr and 106 lb/hr respectively.

Figure 26:
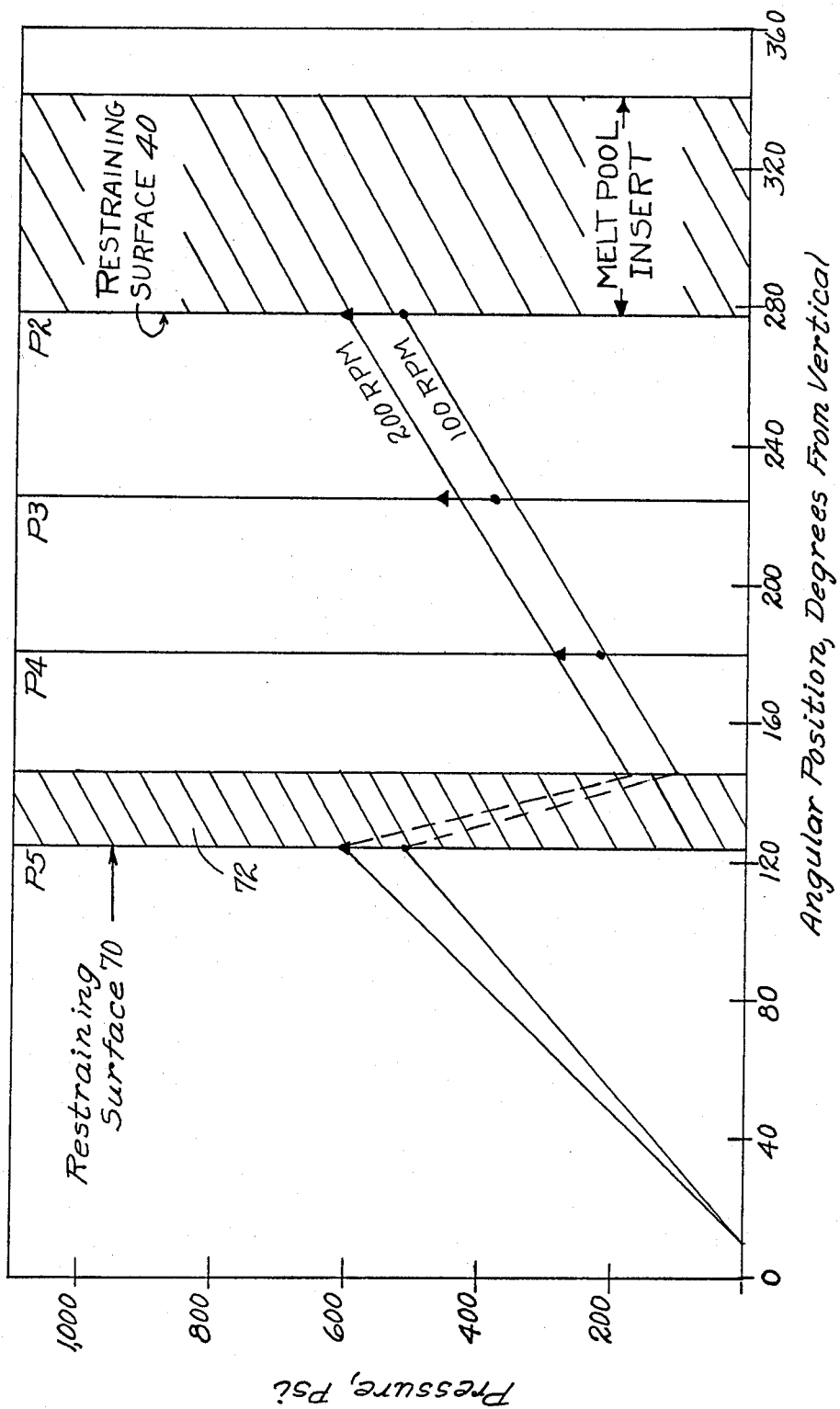

The same processor described above was then altered to provide a second particulate material restraining surface as shown in FIGS. 23 and 24. Melting rates and rotor speeds were selected to be the same as above: 55 lb/hr at 100 rpm and 106 lb/hr at 200 rpm. Clearance past member 72, 0.150 in., was chosen to equalize pressures $P_5$ and $P_2$ at surfaces 70 and 40 respectively. As shown in FIG. 26, pressure generated in the material increases about the circumference of the passage, reaching a first maximum at restraining surface 70 ($P_5$) of 515 psi and 605 psi at 100 rpm and 200 rpm respectively. The pressure is significantly reduced as material is dragged past member 72 and enters the second half of the passage, but progressively rises again as material is dragged forward past points $P_4$ and $P_3$ (FIGS. 23 and 26) to restraining surface 40*j* ($P_2$), where pressure reaches a second maximum of 520 psi and 605 psi at 100 rpm and 200 rpm respectively.

From the results illustrated in FIGS. 25 and 26, it is apparent that providing more than one particulate material restraining surface can lower the pressure levels at each restraining surface as well as balance the radial pressures at opposite sides of the rotor, thereby significantly reducing shaft deflection potential and shaft bearing load.

Although all of the above examples were carried out having channels 0.75 in. in width, the process and apparatus of the present invention are suitable for a wide range of channel widths, e.g. from about 0.75 to about 1.50 inches.

Particulate materials which may be processed by the process and apparatus of the present invention include all particulate materials reducible by heat or mechanical energy, or by dilutent to the liquid state for processing and which have sufficient stability to avoid serious degradation under treatment conditions. Such materials include but are not limited to thermoplastic, thermosetting and elastomeric polymeric materials such as for example, polyolefins (e.g. polyethylenes, polypropylenes), vinylchloride polymers (e.g. polyvinylchloride), fluorine containing polymers, polyvinylacetate based polymers, acrylic based polymers, styrene based polymers (e.g. polystyrene), polyamides (e.g. nylons), polyacetals, polycarbonates, cellulose based plastics, polyesters, polyurethanes, phenolic and amino plastics, epoxy based resins, silicone and inorganic polymers, polysulphone based polymers, various natural based polymers and the like together with copolymers and blends of those materials with each other or with solvents or dilutents or with different solid and liquid additives.

We claim:

1. Apparatus for processing particulate materials which become liquids in the course of processing, and which comprises:
    a rotatable element carrying at least one annular processing channel including opposed side walls having inner wall surfaces;
    a stationary element providing a coaxial surface cooperatively arranged with the processing channel to form an enclosed annular processing passage, the stationary element also having associated with it an inlet for feeding particulate material to the passage, an outlet spaced apart from the inlet for discharging material from the passage, a member providing an end wall surface positioned near the outlet of the passage; a first restraining member having side surfaces positioned between the inlet and the end wall surface and providing a particulate material restraining surface and shaped to provide a clearance between the sides of the first restraining member and inner wall surfaces of the processing channel, the end wall surface and the restraining surface being positioned in the passage to provide a space for collecting a pool of liquid material between the end wall surface and the restraining surface which can at least wet sufficient area of the inner surfaces of the processing channel to generate discharge pressure;

means positioned in the space for collecting a pool of liquid material for occupying a predetermined portion of the space to provide a pool space of predetermined geometry designed to provide preselected discharge pressure characteristics for liquid material collected in the pool space; and means to rotate the rotatable element in a direction from the inlet toward the first restraining member.

2. Apparatus of claim 1 where the rotatable element is a rotor having a cylindrical surface of rotation coaxial with the rotor carrying at least one processing channel having opposed walls extending inwardly from the cylindrical surface, and the rotatable element is adapted for rotation within the stationary element having an internal coaxial surface for forming with the channel an enclosed annular processing passage.

3. Apparatus of claim 1 or claim 2 where at least a portion of the width of the channel between the inner surfaces of the opposed side walls is between about 0.75 to about 1.50 inches and said apparatus includes means to rotate said walls at a speed between about 50 rpm to about 300 rpm.

4. Apparatus of claim 1 or claim 2 where the means positioned in the space for collecting a pool of liquid material comprises a section extending upstream from the end wall surface or extending downstream from the restraining surface.

5. Apparatus of claim 1 or claim 2 wherein the means positioned in the space for collecting material comprises sections extending from the end wall surface toward the restraining surface and from the restraining surface toward the end wall surface.

6. Apparatus of claim 1 or claim 2 where the means positioned in the space for collecting material comprises an extension connecting the end wall surface to the restraining surface.

7. Apparatus of claim 6 where the clearance between the extension and the inner wall surfaces of the processing channel is selected to apply preselected conditions of shear and stress on liquid material collected in the pool space.

8. Apparatus of claim 7 where the clearance is between about 0.110 to about 0.150 inches.

9. Apparatus of claim 1 or claim 2 in which the restraining surface is spaced apart from the end wall surface so that the angle between these surfaces is between about 10° to about 90°.

10. Apparatus of claim 9 where the angle between the surfaces is between about 15° to about 40°.

11. Apparatus of claim 1 or claim 2 including means to control discharge of liquid material from the outlet to secure a desired extent of processing.

12. Apparatus of claim 1 or claim 2 where the end wall surface is adapted to allow at least a limited quantity of the liquid material to recirculate through the passage for mixing with particulate material.

13. Apparatus of claim 1 or claim 2 including means positioned between the inlet and the first restraining member to divert part of the liquid material from the walls of the processing channel to mix the liquid material with particulate material.

14. Apparatus of claim 1 or claim 2 including means to cause accumulation of a portion of the liquid material at the restraining surface so that the accumulated liquid material can be mixed with particulate material.

15. Apparatus of claim 1 or claim 2 where a scraping clearance is provided between one of the side surfaces of the first restraining member and the adjacent side wall of the processing channel so that the liquid material can be accumulated at the restraining surface and mixed with the particulate material.

16. Apparatus of claim 1 or claim 2 including at least a second restraining member providing a surface that can at least partially restrain movement of particulate material, the second restraining member being positioned between the inlet and the restraining surface of the first restraining member and being shaped to provide a clearance between the sides of the second restraining member and inner wall surfaces of the processing channel.

17. Apparatus of claim 16 where the shape and dimensions of at least the second restraining member and the positioning of at least the second restraining member in the passage are selected to balance pressures developed with the processing passage.

18. Apparatus of claim 16 where the restraining surface of the second restraining member is spaced apart from the restraining surface of the first restraining member by about 180°.

19. Apparatus of claim 1 or claim 2 including heating means to melt particulate material in the passage.

20. A method for processing materials which can be converted to liquids comprising the steps of:
introducing particulate material at a feed point to a substantially annular processing zone defined by two drag-inducing, rotatable, substantially circular walls, a coaxial, stationary surface enclosing the processing zone, and a processing zone end wall spaced apart from the feed point;
rotating the walls at substantially equal velocities, in the same direction from the feed point toward the end wall, thereby dragging the material forward through the processing zone;
restraining movement of the main body of dragged-forward particulate material at a final restraining point positioned between the feed point and end wall so that friction is generated by relative movement between the restrained material and the rotating walls thereby inducing melting of at least the particulate material closest to the rotating walls;
collecting melted material as a pool in a melted material collection zone defined by the space between the end wall and restraining point and further defined by means occupying a portion of the space and reducing the available volume between the end wall and the restraining point to provide control of the processing characteristics within the pool of material collected in the defined material collection zone; and discharging the melted material from the collection zone at an outlet point.

21. A method of claim 20 including the step of partially restraining the flow of particulate material at at least at a second restraining point upstream of the first restraining point.

22. A method of claim 20 or claim 21 in which the means occupying a portion of the space between the end wall and the restraining point comprises a section extending upstream from the end wall or extending downstream from the restraining point.

23. A method of claim 20 or claim 21 in which the means occupying a portion of the space between the end wall and the restraining point comprises sections extending from the end wall toward the restraining point and from the restraining point toward the end wall.

24. A method of claim 20 or claim 21 in which the means occupying a portion of the space between the end wall and the restraining point comprises an extension extending from the end wall to the restraining point.

25. A method of claim 20 or claim 21 in which the restraining point is spaced apart from the end wall so that the angle between them is between about 10° to about 90°.

26. A method of claim 25 in which the angle between the restraining point and the end wall is between about 15° to about 40°.

27. A method of claim 20 or claim 21 further including the step of controlling discharge of liquid material from the outlet point to secure a desired extent of processing.

28. A method of claim 20 or claim 21 further including the step of recirculating at least a limited quantity of the liquid material through the processing zone for mixing with particulate material at the feed point.

29. A method of claim 21 in which the restraining capacity at and positioning of at least the second restraining point cooperate to balance the pressures developed within the processing zone.

30. A method of claim 21 in which the second restraining point is spaced apart from the first restraining point by about 180°.

31. A method of claim 20 or claim 21 including the step of applying preselected stress or shear conditions to the liquid material as the material is dragged past the main body of particulate material restrained at the first restraining point.

32. A method of claim 20 or claim 21 including the step of mixing a portion of the liquid material with the restrained particulate material at the first restraining point.

33. A method of claim 20 or claim 21 including the step of mixing a portion of the liquid material with the particulate material at a point between the feed point and a restraining point.

34. A method of claim 20 or claim 21 including the step of heating the particulate material in the processing zone to increase melting of the particulate material.

* * * * *